United States Patent
Riggs

[11] Patent Number: 6,164,697
[45] Date of Patent: Dec. 26, 2000

[54] DETACHABLE CLEAT FOR USE WITH STABILIZERS

[76] Inventor: Thomas A. Riggs, 210 Lundy La., Blairsden, Calif. 96103

[21] Appl. No.: 09/207,702

[22] Filed: Dec. 9, 1998

Related U.S. Application Data

[60] Provisional application No. 60/069,145, Dec. 9, 1997.

[51] Int. Cl.[7] .................................................. B60S 9/02
[52] U.S. Cl. ................................. 280/763.1; 280/43.14; 248/188.9
[58] Field of Search ........................ 280/763.1, 475, 280/764.1, 765.1, 43.24, 43.14; 248/671, 188.8, 188.9; 254/DIG. 1; 244/104 R

[56] References Cited

U.S. PATENT DOCUMENTS

| | | | |
|---|---|---|---|
| 2,502,037 | 3/1950 | Erikainen | 254/DIG. 1 |
| 3,181,891 | 5/1965 | Moats | 280/475 |
| 3,219,362 | 11/1965 | Epstein | 280/763.1 |
| 3,666,290 | 5/1972 | Dalton et al. | 280/763.1 |
| 3,889,972 | 6/1975 | Bredt | 280/763.1 |
| 4,013,267 | 3/1977 | Kirk | 254/DIG. 1 |
| 4,266,809 | 5/1981 | Wuerflein | 280/766 |
| 4,273,244 | 6/1981 | Jensen et al. | 212/181 |
| 4,461,491 | 7/1984 | Eklund | 280/763.1 |
| 4,462,612 | 7/1984 | Dreyer et al. | 280/766.1 |
| 4,634,144 | 1/1987 | Ringe | 280/763.1 |
| 4,824,136 | 4/1989 | Baxter | 280/475 |
| 5,011,184 | 4/1991 | Louden | 280/766.1 |
| 5,051,057 | 9/1991 | Kremer | 280/764.1 X |

FOREIGN PATENT DOCUMENTS

| 236740 | 2/1969 | Russian Federation | 280/763.1 |
|---|---|---|---|

*Primary Examiner*—Brian L. Johnson
*Assistant Examiner*—Bryan Fischmann
*Attorney, Agent, or Firm*—Carol D. Titus; James J. Leary; Jeffrey P. Aiello

[57] ABSTRACT

A cleat that increases the adhesive friction between a base pad of a stabilizer and an unstable ground surface, for inhibiting the base pad from inadvertently moving relative to the unstable ground surface is provided. The cleat inhibits the stabilizer and its utility vehicle from becoming unstable, when the vehicle is positioned on an unstable ground surface, such as sand, snow, ice, mud, or several other well known unstable ground surfaces. The cleat of the present invention is adapted to be detachably coupled to the base pad of the stabilizer. The cleat can be quickly installed on the base pad or easily removed for cleaning. The cleat includes a base plate that is configured complementary to the cross-sectional configuration of the base pad and a base member coupled to a bottom surface of the base plate. The base member is configured to increase the adhesive friction, between the base pad and ground surface, for inhibiting the base pad from inadvertently moving relative to the ground surface. The base member consists of an openwork member that comprises a plurality of interconnected rod members with apertures formed between the rod members.

18 Claims, 2 Drawing Sheets

DETACHABLE CLEAT FOR USE WITH STABILIZERS

CROSS-REFERENCES TO RELATED APPLICATIONS

This application claims the benefit of U.S. Provisional Patent Application Ser. No. 60/069,145 filed Dec. 9, 1997.

BACKGROUND OF THE INVENTION

1. Field of the Invention

The subject invention relates generally to stabilizers used on commercial vehicles, and more particularly, to a cleat that is easily attached and detached from a base pad of a stabilizer and substantially increases traction between the base pad and a ground surface.

2. Description of Prior Art

A number of different of different utility vehicles use stabilizers. Such vehicles include several large commercial utility trucks, such as those used by power companies and arborist companies. A number of small tractors used for industrial purposes such as dredging including skip loaders and back hoes, are also frequently equipped with stabilizers.

A stabilizer usually comprises a leg portion and a base pad. Often hydraulic, pneumatic, or mechanical mechanisms are coupled to the leg portions of the stabilizers for raising and lowering the base pad of the stabilizer. The base pad typically has a flat surface area that may have slightly upturned ends to inhibit the edges of the pad from digging into the ground. The base pad has a periphery greater than the cross sectional dimension of the leg, to prevent the leg from sinking into the ground surface that the base pad is placed on. The base pad may be rectangular, square, or circular in shape, depending on various factors such as the intended applications of the stabilizer and the configuration of the leg.

One known configuration of stabilizers comprises all, or a portion, of the leg configured to extend away from the utility vehicle at a desired angle, with the base pad coupled to a bottom of the stabilizer. The stabilizer may support all or a portion of the weight of the utility vehicle and may limit lateral movement of the vehicle.

An alternate stabilizer configuration is used for landing gear on large commercial trailers. The landing gear is typically mounted to an underframe of the trailer, proximal to a front end of the trailer. In use, the landing gear extends vertically to the ground surface, away from the underframe. The landing gear prevents the trailer from falling forward when the tractor is detached from the trailer, such as when the trailer is stored.

U.S. Pat. No. 4,266,809, by Wuerflein, discloses an outrigger float pad assembly that can be releasably connected to an outrigger lift jack. The lift jack has an annular collar that surrounds a shaft. The float pad has a central hub that upstands from a base. Two closed links are loosely connected to the collar at 180° spacings around the center axis of the shaft, and two lugs are formed on the float pad hub at like 180° spacings around the hub. The links are adapted to fit over the lugs to allow the float pad to releasably connect to the lift jack.

U.S. Pat. No. 4,634,144, by Ringe, discloses a sand shoe articulately jointed to a ground engaging end of a landing gear leg by a collar circumscribing the ground engaging end. Compressed between the base of the leg and a bottom of the sand shoe, is a wedge-shaped resilient member biasing the shoe into a tilted position relative to the plate. The sand shoe is tilted to prevent the shoe from snagging upon objects that pass beneath the trailer when the trailer is moved.

U.S. Pat. No. 4,273,244, by Jensen et al., discloses a crane upper structure self-transferring system. Lift assemblies include outrigger jacks that enable vertical movement of the upper structure. Air pad assemblies are provided between the outrigger jacks and a surface supporting the carrier. Air pad assemblies can also be provided between the lift assemblies and a surface supporting the upper structure.

U.S. Pat. No. 4,461,491, by Eklund, discloses a sand shoe that can be mounted to legs of a trailer. The sand shoe includes a rectangular metal base and upstanding side plates. Central portions of the side plates have openings in the top portions thereof for mounting the sand shoe to the legs of a trailer.

U.S. Pat. No. 4,462,612 discloses a detachable articulated foot that is fastened to a lower end of a supporting leg; U.S. Pat. No. 5,011,184 discloses a stabilizer system for a utility vehicle; and U.S. Pat. No. 4,824,136 discloses landing gear for a vehicle such as a trailer.

A disadvantage common to the prior art, as well as the cited prior art references, is that the base pads or feet thereof have smooth bottom surfaces. When using stabilizers while operating utility vehicles, such as large utility trucks or small tractors, on slick or unstable ground surfaces, such as snow, ice, and mud, the stabilizer base pads may slide on the surface as the pressure that the stabilizer exerts on the ground increases, causing the utility vehicle to become dangerously unstable. If the utility vehicle were to become unstable, harm may come to persons working on or around the vehicle or nearby property or objects could be damaged.

Thus, there exists a need for an apparatus that increases the adhesive friction between a base pad of a stabilizer and an unstable ground surface for inhibiting the base pad from inadvertently moving relative to the unstable ground surface, thereby inhibiting the stabilizer and its associated utility vehicle from becoming unstable.

OBJECTS OF THE INVENTION

It is therefore an object of the present invention to provide an improved cleat for use with a stabilizer;

It is another object of the present invention to provide a cleat that increases the adhesive friction between a base pad of a stabilizer and an unstable ground surface for inhibiting the base pad from inadvertently moving relative to the unstable ground surface;

It is a further object of the present invention to provide a cleat that is easily detachably coupled to the base pad of the stabilizer; and It is yet another object of the present invention to provide a cleat that can be easily cleaned.

SUMMARY OF THE INVENTION

These and other objects and advantages of the present invention are achieved by providing a cleat that increases the adhesive friction between a base pad of a stabilizer and an unstable ground surface, for inhibiting the base pad from inadvertently moving relative to the unstable ground surface. The cleat of the present invention inhibits the stabilizer and its associated utility vehicle from becoming unstable, when the vehicle is positioned on an unstable ground surface, such as sand, snow, ice, mud, or several other well known unstable ground surfaces. The cleat of the present invention is adapted to be detachably coupled to the base pad of the stabilizer. The cleat is coupleable to the base pad using only hand tools, or may be coupled to the base pad by hand. Thus, the cleat can be quickly installed on the base pad upon arriving at a desired work site. The cleat can also be easily removed from the base pad to clean mud, ice, and other debris from the ground surface that collected on the cleat.

In the preferred embodiment, the cleat of the present invention includes a base plate that is configured complementary to the cross-sectional configuration of the base pad. The base plate preferably has a plurality of openings formed therethrough to facilitate cleaning of the cleat.

A base member is coupled to a bottom surface of the base plate. The base member is configured to increase the traction, referred to as adhesive friction, between the base pad of the stabilizer and an unstable ground surface, for inhibiting the base pad from inadvertently moving relative to the ground surface. The base member consists of an openwork member that comprises a plurality of interconnected rod members with apertures formed between the rod members.

As the pressure that the stabilizer exerts on the ground increases, the rod members extend into the ground surface to increase the adhesive friction between the base pad and ground surface, for inhibiting the base pad from inadvertently moving relative to the ground surface, thereby inhibiting the stabilizer and utility vehicle from becoming unstable. Therefore, the cleat of the present invention inhibits the stabilizer, and thus the utility vehicle from becoming unstable, when the vehicle is positioned on an unstable ground surface, such is sand, snow, ice, mud, or several other well known unstable ground surfaces.

The invented cleat further includes back wall is affixed to a back edge of the base plate and a paid of side walls affixed to side edges of the base plate. The walls include an inwardly projecting flange that extends over the edges of the base pad to slidably retain the cleat on the base pad.

Means are provided for detachably coupling the invented cleat to the stabilizer's base pad. In one embodiment, the coupling means comprises a pair of diametrically aligned guides that are affixed to the flange of each side wall and adjacent to an open end of the cleat. An elongated bolt is dimensioned to extend across the open end and to be retained in the guides for securely coupling the cleat to the base pad.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventor for carrying out the invention. Various modifications, however, will remain readily apparent to those skilled in these arts, since the generic principles of the present invention have been defined herein.

Figure 2:
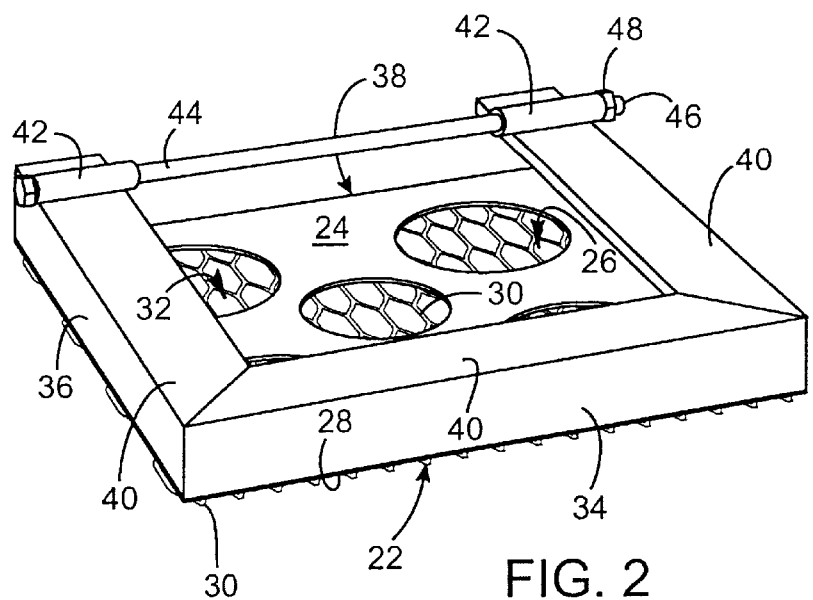
FIG. 2 is a rear perspective view of a preferred embodiment of the cleat of the present invention.
Figure 1:
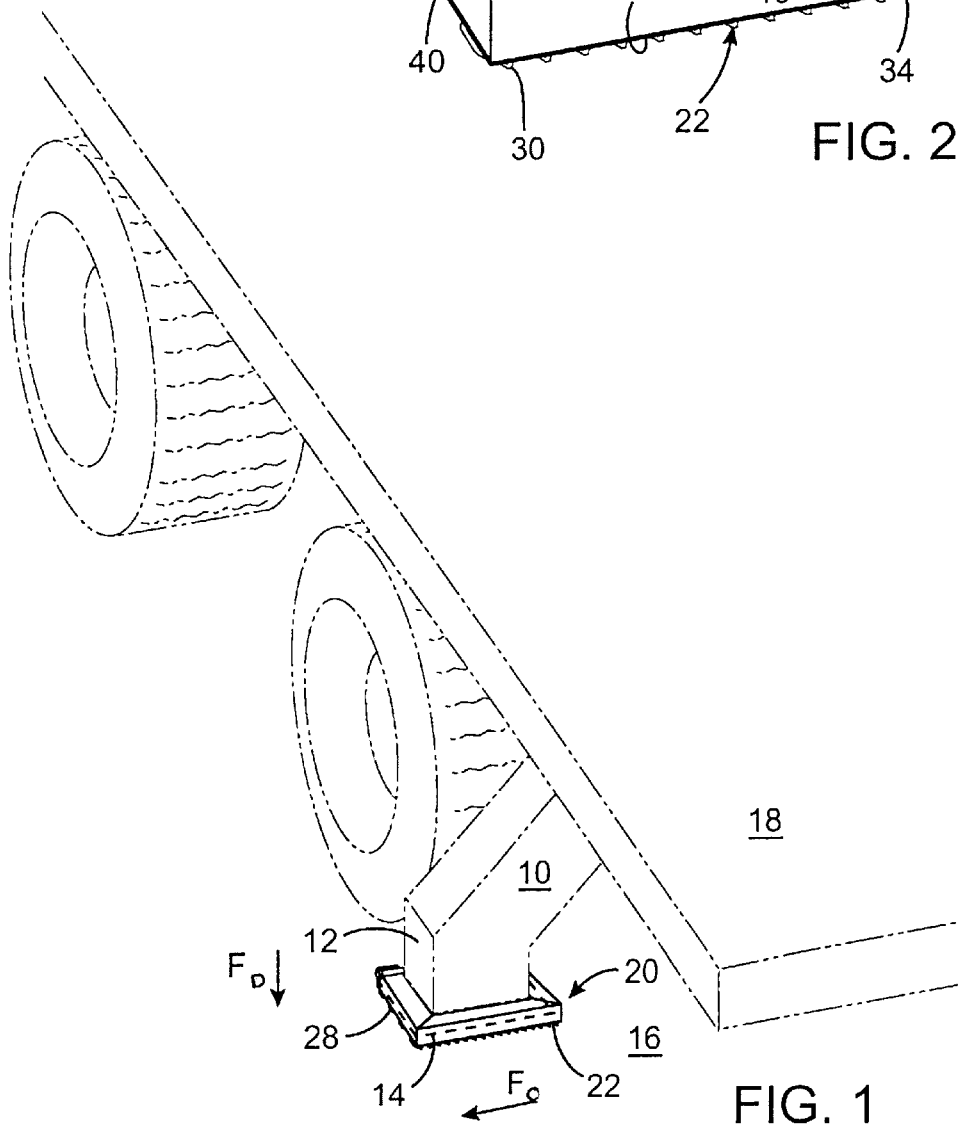
FIG. 1 is a phantom, perspective view of a large commercial utility truck having a stabilizer extended therefrom with a preferred embodiment of the present invention detachably coupled to a base pad of the stabilizer.
Figure 3:
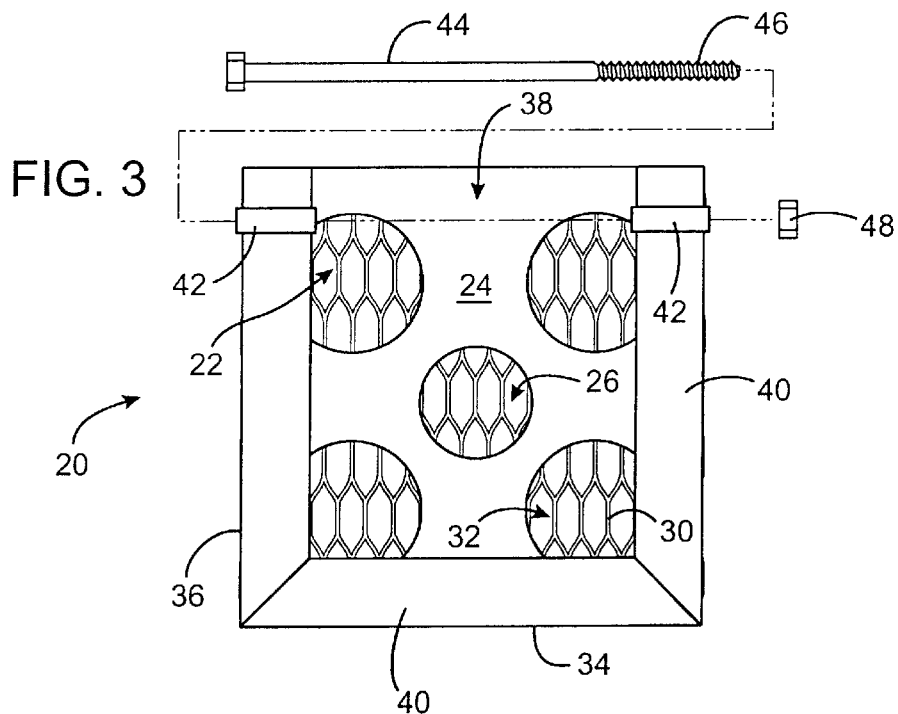
FIG. 3 is a top plan view of the cleat of the preferred embodiment.
Figure 4:
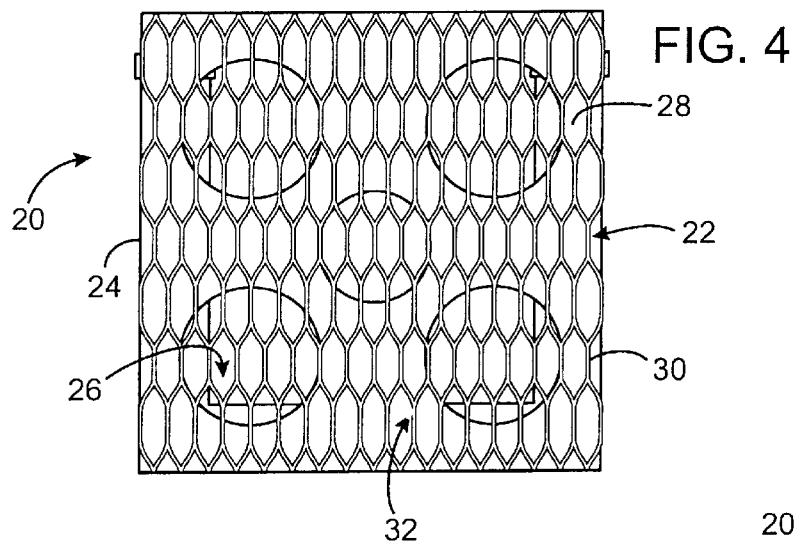
FIG. 4 is a bottom plan view of the present invention.
Figures 5, 6:
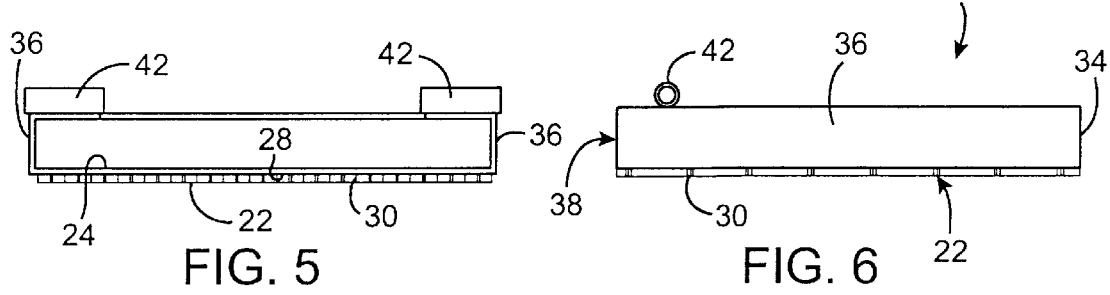
FIG. 5 is a front elevational view showing an open front end of the present invention.
FIG. 6 is a side elevational view of the preferred embodiment of the present invention.

FIG. 1 of the drawings shows a stabilizer 10 with a leg portion 12 and a base pad 14. The stabilizer base pad 14 typically has a periphery greater than the periphery of the leg 12, for preventing the stabilizer 10 from sinking into a ground surface 16. The stabilizer 10 is extended down from a large commercial utility truck 18. However, the stabilizer 10 may be coupled to any one of several well known utility vehicles, such as large utility trucks, tractors, back hoes, or other well known utility vehicles. A hydraulic mechanism (not shown) is typically used to lower the stabilizer 10 and potentially partially raise the truck 18, and to raise the stabilizer 10 while the truck 18 is in transit.

The stabilizer 10 shown has a cleat, shown generally at 20, constructed according to the preferred embodiment of the present invention, detachably coupled to its base pad 14. The invented cleat 20 is configured to increase the adhesive friction between the base pad 14 of the stabilizer 10 and the ground 16, which may comprise an unstable ground surface, for inhibiting the base pad 14 from inadvertently moving relative to the ground 16.

At a work site, the ground surface 16 may comprise sand, dirt, mud, snow, ice, or any other ground surface. The ground 16 may also comprise any improved surface such as asphalt or concrete, that may have a covering of with an unstable material, such as mud, ice, or snow for example, causing the improved surface to be somewhat slick or otherwise unstable.

The stabilizers 10 are lowered onto the ground surface 16 to increase the stability of the truck 18. The stabilizers 10 typically extend away from the utility truck 18 at an angle increase its stability so that the truck 18 may be used for its intended purpose. As the base pad 14 is pressed on the ground 16, it exerts a downward force $F_D$ and an outward force $F_O$, relative to the truck 18, on the ground 16. When the ground 16 is slick or muddy, the forces $F_D$ and $F_O$, and particularly the outward force $F_O$, may cause the base pad 14 to slide on the ground 16. The weight of the truck 18 may also cause the base pad 14 to slide on the ground 16, if the truck 18 is at a work site that is sloped.

With the invented cleat 20 coupled to the stabilizer base pad 14, the stabilizer 10 is lowered onto the ground 16. As the weight that the stabilizer base pad 14 exerts on the ground 16 increases, a base member 22 of the cleat 20 (to be discussed thoroughly hereinafter) may extend at least slightly into the ground 16 to increase the traction, referred to is adhesive friction, between the base pad 14 of the stabilizer 10 and the ground 16, and thus inhibit the stabilizer 10 from moving relative to the ground 16. With the base member 22 embedded in the ground 16, slippage between the base pad 14 and the ground 16 is substantially inhibited. Thereby, the cleat 20 of the present invention inhibits the stabilizer 10 from inadvertently moving about on the ground 16, and thus the truck 18 is inhibited from becoming unstable.

Referring to FIGS. 2–6, the invented detachable cleat 20 includes a base plate 24 that preferably is dimensioned to mate with the base pad 14 of a desired stabilizer 10. In the preferred embodiment, the base plate 24 is substantially flat and rectangular in cross sectional configuration. In one common embodiment, the base plate 24 is about 15 inches by 13 inches wide and approximately ⅜ thick. The base plate 24, along with the other portions of the invented cleat 20, may be fabricated using well known methods and comprised of a suitable strong, durable, and preferably weather resistant material. For example, base plate 24, along with the other portions of the invented cleat 20, comprise a known metal alloy, such as a suitable steel alloy. Additionally, the cleat 20 may have a protective coating applied thereto to enhance the weather resistant properties of the materials comprising the cleat 20.

A plurality of openings 26 are disposed through the base plate 24. The openings 26 as shown are circular in shape, but they may comprise any suitable shape that provides access through the base plate 24 to enable debris and other matter that may have collected on the cleat 20 to be removed from the base plate 24.

The base member, shown generally at 22, is affixed to a bottom surface 28 of the base plate 24. In the preferred embodiment, the base member 22 is dimensioned to substantially cover the bottom surface 28, but alternatively, may be configured to cover selected portions of the bottom surface 28. The base member 22 consists of an openwork member that comprises a plurality of interconnected rod members 30 forming a multiplicity of apertures 32 therebetween. The base member 22 may be fabricated using any appropriate means, or may comprise a lattice configuration of a suitable expanded metal alloy, such as steel alloy. The base member 22 is affixed to the base plate 24 by any applicable means, such as welding, for example.

When force, such as the forces ($F_D$ and $F_O$) discussed above, is exerted on the base member 22, the rods 30 thereof become at least partially embedded in the ground 16 to significantly increase the traction, or adhesive friction, between the base pad 14 and the ground 16, and thus inhibit the stabilizer 10 from moving relative to the ground 16. The configuration of the rods 30 relative to one another further increase the adhesive friction that the invented cleat 20 provides for the base pad 14. Additionally, the multiplicity of apertures 32 between the rod members 30 enables the rods 30 to be embedded into the ground 16 and facilitates cleaning of the base member 22, along with the other portions of the cleat 20.

Referring still to FIGS. 2–6, the invented detachable cleat 20 also includes a back wall 34 that is affixed to a back edge of the base plate 24, and a pair of side walls 36 that are affixed to side edges of the base plate 24 for forming an open front end 38. Each of the walls 34, 36 and include a cantilevered flange 40 that projects inwardly and parallel to the base plate 24. The walls 34, 36 are sufficiently high to accommodate any upturned side edges or other portions of the base pad 14. The inwardly projecting flange 40 is provided to retain the cleat 20 on the base pad 14, such as when the truck 18 is in transit, and to limit movement of the cleat 20 on the base pad 14. In one preferred embodiment, the walls 34, 36 comprise 90° angle iron that is approximately ¼ inch thick.

Means are provided for detachably coupling the invented cleat 20 to the stabilizer's base pad 14. In one embodiment, the coupling means comprises a pair of diametrically aligned cylindrical guides 42 that are affixed to each inwardly projecting flange 40 adjacent to the open end 38 of the cleat 20 and an elongated bolt 44 that is dimensioned to extend across the open end 38 and to be retained in the guides 42.

In use, a threaded end 46 of the bolt 44 is disposed through one of the guides 42, drawn across the open end 38 of the cleat 20, and disposed through the remaining guide 42. A nut 48 is then threaded onto the bolt's threaded end 46, until the nut 48 is tightened against the guide 42 (shown in FIG. 2. The guides 42 and bolt 44 are of a sufficiently robust diameter to secure the invented cleat 20 to the base pad 14, particularly when the cleat 20 is in use. In the preferred embodiment, the guides are about ½" in diameter and 1½" in length.

Referring again to the drawing Figures, and particularly to FIG. 1, in use the cleat 20 is detachably coupled to the base pad 14 by first aligning the open end 38 of the cleat 20 with the stabilizer's base pad 14. The cleat 20 is then slid onto the base pad 14, with the side walls 36 passing along outer edges of the base pad 14. The cleat 20 is slid onto the base pad 14 until a back edge of the base pad 14 abuts the cleat's back wall 34. The threaded end 46 of the bolt 44 is disposed through one of the guides 42, drawn across the open end 38 of the cleat 20, and disposed through the remaining guide 42. The nut 48 is threaded onto the bolt's threaded end 46, until the nut 48 is tightened against the guide 42 to positively secure the cleat 20 to the base pad 14. The cleat 20 is easily removed from the base pad 14 by simply reversing the coupling procedures.

Mud, dirt, or debris can be removed from the cleat 20, by first removing the cleat 20 from the base pad 14. The cleat 20 may then be cleaned using any suitable means, such as water or a brush, for example. The apertures 26 in the base member 22 and openings in the base plate 24 afford facile cleaning of the cleat 20, and particularly the base plate 24, by allowing access to both the base plate 24 and base member 22.

Thus, there has been described a cleat that increases the adhesive friction between a base pad of a stabilizer and an unstable ground surface, for inhibiting the base pad from inadvertently moving relative to the unstable ground surface is provided. The cleat inhibits the stabilizer and its utility vehicle from becoming unstable, when the vehicle is positioned on an unstable ground surface. The invented cleat is adapted to be detachably coupled to the base pad of the stabilizer and can be quickly installed on the base pad or easily removed for cleaning. The cleat includes a base plate that is configured complementary to the cross-sectional configuration of the base pad and a base member coupled to a bottom surface of the base plate. The base member is configured to increase the adhesive friction, between the base pad and ground surface, for inhibiting the base pad from inadvertently moving relative to the ground surface. The base member consists of an openwork member that comprises a plurality of interconnected rod members with apertures formed between the rod members.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A cleat for increasing the adhesive friction between a base pad of a stabilizer and a ground surface comprising:
   a base plate;
   a back wall affixed to a back edge of the base plate and a pair of side walls affixed to side edges of the base plate, such that an open end is formed, each of the walls including an inwardly projecting flange configured to extend over side edges of the base pad;

a securing assembly for detachably coupling the cleat to the base pad; and a base member affixed to a bottom surface of the base plate, the base member comprising an openwork structure that includes a plurality of interconnected rod members, wherein the rod members become at least partially embedded in the ground surface to increase the adhesive friction between the base pad and ground.

2. The cleat of claim 1 further comprising:

the base member dimensioned to substantially cover the bottom surface of the base plate, the base member having a multiplicity of apertures formed between the plurality of interconnected rod members, the apertures enabling the rod members to be at least partially embedded in the ground to increase the adhesive friction between the base pad and ground to inhibit the stabilizer from moving relative to the ground; and the base plate having a plurality of openings formed therethrough.

3. The detachable cleat of claim 2 wherein the multiplicity of apertures between the rod members and the plurality of openings in the base plate aid with cleaning of the cleat.

4. The detachable cleat of claim 1 wherein the interconnected rod members form a multiplicity of apertures passing through the base member.

5. The detachable cleat of claim 1 wherein said base plate has a plurality of openings passing therethrough.

6. A cleat for increasing the adhesive friction between a base pad of a stabilizer and a ground surface comprising:

a base plate;

a back wall affixed to a back edge of the base plate and a pair of side walls affixed to side edges of the base plate, such that an open end is formed, each of the walls including an inwardly projecting flange configured to extend over side edges of the base pad;

a securing assembly for detachably coupling the cleat to the base pad; and a base member affixed to a bottom surface of the base plate, the base member comprising an openwork structure that includes a plurality of interconnected rod members, wherein the rod members become at least partially embedded in the ground surface to increase the adhesive friction between the base pad and ground, the base member dimensioned to substantially cover the bottom surface of the base plate, the base member having a multiplicity of apertures formed between the plurality of interconnected rod members, the apertures enabling the rod members to be at least partially embedded in the ground to increase the adhesive friction between the base pad and ground to inhibit the stabilizer from moving relative to the ground; and the base plate having a plurality of openings formed therethrough, wherein the multiplicity of apertures between the rod members and the plurality of openings in the base plate aid with cleaning of the cleat.

7. The detachable cleat of claim 6 wherein the securing assembly can be actuated by hand.

8. The detachable cleat of claim 6 wherein the securing assembly can be actuated by hand.

9. A cleat for increasing the adhesive friction between a base pad of a stabilizer and a ground surface comprising:

a base plate having a cross-sectional configuration complementary to the cross-sectional configuration of the base pad, the base plate having a plurality of openings formed therethrough;

a back wall affixed to a back edge of the base plate and a pair of side walls affixed to side edges of the base plate, such that an open end is formed for receiving the base pad and a leg portion of the stabilizer, each of the walls sufficiently high to accommodate upstanding portions of the base pad, each of the walls including an inwardly projecting cantilevered flange configured to extend over side edges and of the base pad to aid with retaining the cleat on the base pad;

a securing assembly for detachably coupling the cleat to the base pad; and a base member affixed to a bottom surface of the base plate, the base member comprising an openwork structure that includes a plurality of interconnected rod members with a multiplicity of apertures formed therebetween, the apertures enabling the rod members to be at least partially embedded in the ground to increase the adhesive friction between the base pad and ground, for inhibiting the stabilizer from moving relative to the ground.

10. The detachable cleat of claim 9 further comprising:

the base member dimensioned to substantially cover the bottom surface of the base plate, the base member comprises an expanded metal alloy, the multiplicity of apertures between the rod members of the base member and the plurality of openings in the base plate facilitating cleaning of the cleat.

11. The detachable cleat of claim 9 wherein the securing assembly further comprises:

a pair of diametrically aligned cylindrical guides that are affixed to each inwardly projecting flange adjacent to the open end of the cleat; and an elongated bolt member dimensioned to extend across the open end of the cleat and to be retained in the guides, the bolt member having a threaded end, wherein the threaded end of the bolt member is disposed through one of the guides, drawn across the open end of the cleat, and disposed through the remaining guide, a nut is then threaded onto the threaded end of the bolt until the nut is tightened against the guide to detachably couple the cleat to the base pad.

12. The detachable cleat of claim 9 wherein the cleat comprises selected weather resistant materials.

13. The detachable cleat of claim 12 the selected weather resistant materials are selected from the group consisting of steel alloy and aluminum alloy.

14. A cleat for increasing the adhesive friction between a base pad of a stabilizer and a ground surface comprising:

a base plate;

a securing assembly for detachably coupling the cleat to the base pad; and a base member affixed to a bottom surface of the base plate, the base member formed of an expanded metal alloy that includes a plurality of interconnected rod members with a multiplicity of apertures formed therebetween, wherein the rod members become at least partially embedded in the ground surface to increase the adhesive friction between the base pad and ground.

15. The detachable cleat of claim 14 wherein said base plate has a plurality of openings passing therethrough.

16. The detachable cleat of claim 14 wherein the multiplicity of apertures between the rod members and the plurality of openings in the base plate aid with cleaning of the cleat.

17. The detachable cleat of claim 14 wherein the securing assembly can be actuated by hand.

18. The detachable cleat of claim 14 wherein each of the walls includes an inwardly projecting flange configured to extend over side edges of the base pad.

* * * * *